Figure 1:
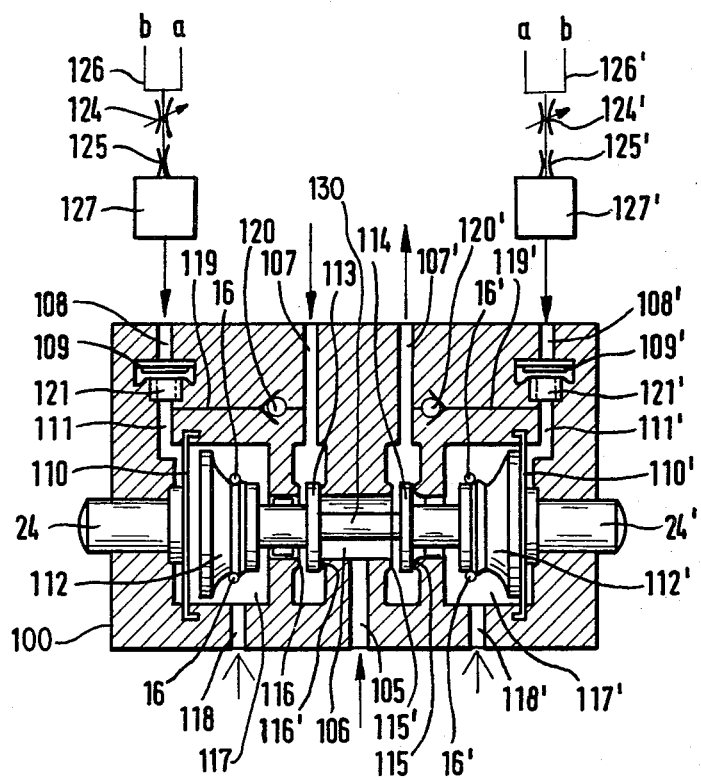

United States Patent [19]

Gassert

[11] 4,356,842
[45] Nov. 2, 1982

[54] CONTROL VALVE SET FOR A COMPLETELY PNEUMATICAL LOW- AND OPERATION PRESSURE CONTROL

[75] Inventor: Willy Gassert, Solothurn, Switzerland

[73] Assignee: Ernst Wirz, Gruningen, Switzerland; a part interest

[21] Appl. No.: 195,605

[22] PCT Filed: Jul. 10, 1979

[86] PCT No.: PCT/CH79/00098
§ 371 Date: Mar. 10, 1980
§ 102(e) Date: Mar. 10, 1980

[87] PCT Pub. No.: WO80/00269
PCT Pub. Date: Feb. 21, 1980

[30] Foreign Application Priority Data

Jul. 10, 1978 [CH] Switzerland .......................... 7635/78

[51] Int. Cl.³ .......................................... F15B 13/042
[52] U.S. Cl. .............................. 137/625.6; 137/624.18
[58] Field of Search .......................... 137/625.6, 624.18

[56] References Cited

U.S. PATENT DOCUMENTS 2,773,486 12/1956 Albers .
3,429,327 2/1969 Wright .
3,592,230 7/1971 Piroutek .
3,707,982 1/1973 Hogel .

FOREIGN PATENT DOCUMENTS 1200084 3/1966 Fed. Rep. of Germany .
1475930 10/1970 Fed. Rep. of Germany .
1653525 6/1971 Fed. Rep. of Germany .
2060194 6/1971 France .
2150639 4/1973 France .
2346584 10/1977 France .

Primary Examiner—Gerald A. Michalsky
Attorney, Agent, or Firm—Dressler, Goldsmith, Shore, Sutker & Milnamow, Ltd.

[57] ABSTRACT

A pneumatic control valve for a fully pneumatic system for controlling both the low pressure and working pressure sides of a pneumatic installation. The valve mechanism is designed to increase the switching frequency of the mechanism.

2 Claims, 2 Drawing Figures

U.S. Patent    Nov. 2, 1982    4,356,842

CONTROL VALVE SET FOR A COMPLETELY PNEUMATICAL LOW- AND OPERATION PRESSURE CONTROL

The invention relates to a pneumatically operated control valve for a fully pneumatic low-pressure and actuating-pressure control system, especially for transmitting signals, or for the timed control and sequential control of pneumatic or hydropneumatic machines, this control valve having the features which follow:

(a) A valve-slide is located in a valve housing, which has one inlet passage for compressed air, at least one venting passage, two outlet passages, and two control input passages, this valve-slide being intended to effect the alternate connection of the outlet passages to the inlet passage, and to the venting passage;

(b) the valve-slide is capable of being shifted between two stitching positions, which are secured by means of resilient latching devices, the valve-slide being shifted by applying control pressure to its ends;

(c) a valve is located, in each case, in the control input passages, this valve opening or closing the control input passage in question, in accordance with the pressure;

(d) that portion of each control input passage which lies between the valve and the valve-slide is capable of being vented via a non-return valve.

A control valve of the aforementioned type has been disclosed in German Auslegeschrift No. 1,653,525. This publication discloses a rapid-switching 4/2-way valve, with a snap-action or latching device, this control valve having control lines which, in each case, possess a pressure valve, and which can be rapidly vented via non-return valves.

The known arrangement is designed for an oscillatory control system, and cannot be used for a sequential control system, or for a timed control system.

In contrast to this known arrangement, the object underlying the present invention is to improve the control valve of the type initialling mentioned in such a manner as to allow the switching frequency of the control valve to be increased, to obtain a highly reproducible switching action, to enable, in comparatively large control systems, several identical control valves to be connected together more simply, and without auxiliary valves, while allowing the control valve to be operated both automatically and manually. This object is achieved, according to the invention, by means of the following features:

(e) the valves are normally open, and close when the difference between the pressure prevailing upstream and downstream of the valve in question exceed a prescribed value;

(f) the non-return valve of the control input passage, to which pressure is to be admitted in order to switch the valve-slide, is connected to the outlet passage which carries pressure prior to the switching-over operation, while the non-return valve of the other control input passage is connected to the outer outlet line.

It is possible to increase the switching frequency as a result of the rapid venting of the control input sections immediately following the switching-over of the valve-slide, while the switching frequency can be proportionately increased only by increasing the pressure at the inlet passage of the control valve, provided that the control valve is fitted out as a 5/2-way valve, and is connected, via an operating valve, to a double-acting cylinder. The control valve can quickly be assembled with valves of the same type to form a pneumatic control system, only one connecting hose between two similar control valves being necessary for each functional phase.

In a further development of the invention, the valve-slide can possess a manual operating device, an AND-gate being connected upstream of each control input passage, the control pressure being presented at one input passage of this AND-gate, and a pressure-signal, which can be removed for the purpose of manual operation, being present at the other end of this AND-gate.

Figure 2:
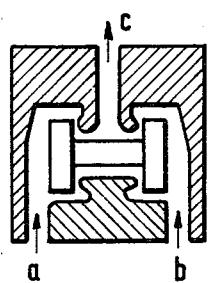

An illustrative embodiment of the invention is represented in the drawing, in which:

FIG. 1 shows a central longitudinal section through a control valve, the representation being partially diagrammatic, and FIG. 2 shows an AND-gate.

In a valve housing 100, the control valve, shown in FIG. 1, possesses an inlet passage 105, which is connected to a compressed-air source, not represented, and which opens into a central space 106, it being possible to connect this space, according to choice, with one of two outlet passages 107, 107'. The supply of control air to the control valve is effected via control inlets 108, 108', in which, in each case, a valve 109, 109' is located, this valve being normally open, and closing in accordance with the differential pressure. The valves 109, 109', which close in accordance with the differential pressure, are provided, in each case on the side facing away from the control input passages, with a light compression spring 121, 121'. The compression springs 121, 121' hold the valve-discs 109, 109' of the valves against the upper end-face of the bore of the valves 109, 109', with a slight preload.

The control pressure prevailing in the sections 111, 111' of the control input passages is applied to membranes 110, 110', which interact with the ends 112, 112' of a valve-slide 130, which carries two valve-discs 113, 114. Resilient latching devices 16, 16', such as spring bars that are affixed at their ends to the housing 100, are assigned to the valve discs 113, 114, these devices interacting with pairs 101, 101' of annular grooves at the ends 112, 112' of the valve-slide 130, and which press the valve discs of the valve-slides 113, 114 onto the valve seats 115, 116', or 115', 116, when the pressure in the space 106 increases.

The membranes 110, 110', respectively, separate the control input sections 111, 111' from the spaces 117, 117' in the valve housing 100, these spaces receiving the ends 112, 112' of the valve-slide 130. The spaces 117, 117' possess venting passages 118, 118', which can be alternately connected to the outlet passages 107, 107'. This connection is brought about by means of the two valve discs 113, 114 of the valve-slide 130, the valve seats 116, 116' and 115, 115' being respectively assigned to these valves discs, on sides which are, in each case, oppositely located. The two valve seats 115' and 116' form the boundary of the central space 106 on the left-hand and right-hand sides, while the two valve seats 115, 116 form the boundaries of the spaces 117, 117' at the ends of the control valve with respect to the outlet passages 107, 107' and to the central space 106.

The two control input sections 111, 111' are connected to the outlet passages 107, 107' by the lines 119, 119'. Non-return valves 120, 120' are connected in the lines 119, 119', these valves being capable, in each case, of opening in the direction of the outlet passages 107, 107'.

At opposite sides, the valve housing 100 possesses two bores 128, 128', which extend coaxially with respect to the valve-slide 130, and receive, in each case, a manual operating device, in the form of visual indicators 24, 24', in a manner which is leakproof but permits these devices to be shifted, their inner ends interacting with the outside of the membranes 110, 110', and the ends 112, 112' of the valve-slide 130.

AND-gates 126, 126' are, in each case, connected upstream of the control input passages 108, 108', delay restrictors 124, 124', orifice plates 125, 125' and small volumes 127, 127' being arranged in sequence after these AND-gates. According to FIG. 2, a control pressure is present at the one input a of each AND-gate 126, 126', while a pressure signal, which can be removed for the purpose of manual operation, is present at the other input b, so that there is through-passage at c only when air is admitted to a and b: When b is vented, the inlet a, to which air is admitted, is closed, and c remains vented, via b.

The control valve can be used both for sequential control systems and for timed control systems, or for combinations of the two.

In a sequential control system for a double-acting pneumatic actuating cylinder, which is not represented, "T" tube pieces are inserted into the two outlet passages 107, 107'. The two ends of the cross pieces of the two "T" tube pieces are connected to hoses. The one hose of each of the two "T" tube pieces is connected, in each case, to one of two sides of a 5/2-way valve, which is not shown, of the double-acting pneumatic or hydropneumatic actuating-cylinder. The two other hoses from the two "T" tube pieces are connected to the two sides of two limit-sensing valves, for example, roller-type lever valves, which are not shown, in the region of the two end positions of the piston of the actuating-cylinder. These limit-sensing valves are normally closed, by spring-preloading, and do not open until the piston rod of the actuating-cylinder is in functional connection with one of the limit-sensing valves, in each case. The outlets from the limit-sensing valves communicate with the inputs a of the AND-gates 126, 126' of an additional control valve, which is not shown but is in accordance with the invention, and is thus designed in exactly the same manner as shown in FIG. 1. The time-delay elements 124, 124', shown in FIG. 1, are omitted in the case of the sequential control system which has been described.

In a combined timed and sequential control system, both the limit-sensing valves, which are operated by the piston rod of the actuating-cylinder, and the time-delay elements 124, 124', which have been described, are used.

The mode of operation of the control valve shown in FIG. 1 is as follows:

In the position of the valve-slide 130, represented in FIG. 1, air is admitted, via the inlet passage 105, to the central space 106 and the opened valve 114, 115' of the control outlet 107'. The control 107 is vented via the opened valve 113, 116, the space 117 and the venting passage 118. In the same way, the control input section 111 is vented via the line 119, the non-return valve 120, and the outlet passage 107. In addition, no pressure is present at the two control inputs 108, 108'.

The control pressure in the outlet passage 107' closes the non-return valve 120'. No pressure is present in the control input section 111'.

The valve-slide is held in its right-hand position by the resilient latching devices 16, 16'.

In order to switch over the valve-slide 130, control pressure is introduced, via the time-delay restrictor 124' and through the orifice plate 125', into the volume 127', where the inflowing control compressed air is calmed. Since the valve 109' switches in accordance with the pressure and, in the normal state, allows the control air to pass through even when the compressed spring 121' presses the valve disc against the upper end-face of the bore of the valve 109', the valve 109', before closing, allows a pressure pulse to pass through to the membrane 110'. The action of this pressure pulse on the membrane overcomes the counter-pressure of the latching device 16, 16', so that the valve-slide is abruptly shifted into the other, left-hand end position. The resilient latching devices 16, 16' latch into the annular groove on the ends 112, 112' of the valve-slide 130, which was previously unoccupied, and arrest the valve-slide in its left-hand end position.

The switching-over of the valve-slide 130 causes the outlet passage 107 to be connected, via the valve 113, 116', which is now open, to the central space 106 and the pressure line 105, as a result of which air is admitted to the outlet passage 107.

In addition, the outlet passage 107' is now connected, via the valve 114, 115, which has now been opened, and the space 117', to the venting passage 118', as a result of which the outlet passage 107' is vented. In consequence of this, pressure can be removed from the control output section 111', via the line 119' and the non-return valve 120', venting into the outlet passage 107'. As a result of this, the valve 109', which functions in accordance with the pressure, closes. The valve 109' remains closed until the next control valve to be triggered has switched over, and has vented the inlet a of the AND-gate 126'.

In addition to the automatic triggering of the valve-slide 130, as described above, it is also possible to operate the valve-slide manually, by means of the visual indicators 24, 24'. However, previous venting of the input b of the AND-gates 126, 126' is a prerequisite for manual operation, a pressure corresponding to the pressure at the control inlet 105 being continuously applied at this input b while the control is automatic.

The supply of control pressure to the control valve can also be effected without the AND-gates 126, 126', as represented, and also without the delay restrictors 124, 124', by supplying the control pressure directly to the orifice-plates 125, 125'.

For the compact assembly of a pneumatic control system, which can comprise only the control valves according to the invention, it is advisable to provide the valve housing with three connecting bores for the input b of the two AND-gates 126, 126', and for the inlet passages 105, these bores being perpendicular to the plane of the drawing in FIG. 1. In a stack, produced from the control valves, the three bores of each valve housing are then aligned with each other, over the entire series of side-by-side control valves, so that one bore supplies compressed air to all inlet passages 105 of the control valve throughout the stack, while the two other bores are, in each case, connected to each other and to the input b of the AND-gates 126 and 126', throughout the entire stack of valves. Air is admitted to, or vented from the bores connecting the input b of the AND-gates 126, 126', on either one side or both sides of the stack. If all inputs b of the AND-gates 126, 126' are vented, they are all closed, at input a, by the control pressure, according to FIG. 2, so that the output c is vented via b. This two-sided venting of all the b inputs of the AND-gates 126, 126' permits each control valve to be switched over manually, by means of the visual indicators 24, 24', and, when air is admitted, the inputs b of the AND-gates 126' are closed. In consequence of this, the control inputs a of the AND-gates 126' are opened, so that all control valves in the entire valve-stack are automatically switched by the control pressure, into their starting position. When air is admitted to the inputs b of the two AND-gates 126 and 126', control takes place automatically.

Using the same control valve, by means of which the operating valves for the actuating cylinder are triggered, it is also possible to carry out, at the same time, measurement functions and presence-monitoring functions, using compressed air or reduced pressure, at a pressure which, in a connecting hose, which is not shown but is connected to the input a of the AND-gate 126, 126', rises slightly above the switching limit of the resilient latching device 16, 16', and moves the valve-slide into the other end position.

Furthermore, the control valve according to the invention enables the switching frequency of the control valve to be increased solely by increasing the air pressure, and proportionately to this increase in pressure, provided that the operating valve is a 5/2-way valve to which a double-acting actuating-cylinder is connected.

The expert, skilled in the art, can readily appreciate that, instead of the membranes 110, 110' shown in FIG. 1, the ends 112, 112' of the valve-slide 130 can be designed as pistons, in the spaces 117, 117', without any fundamental alteration of the mode of operation of the valve.

I claim:

1. In a pneumatic installation having a low pressure and working pressure side comprising a pneumatically operated control valve for a fully-pneumatic system for controlling both the low pressure and working pressure sides thereof and adapted to be used for signalling purposes, time-controlling or sequence-controlling pneumatic or hydropneumatic machines, the improvement comprising: a valve slide located in a valve housing having an inlet passage for compressed air, at least one vent passage, two outlet passages, and two control input ports, said valve slide being provided for the purpose of alternately connecting the outlet passages to the inlet passage and to the vent passage; said valve slide being shiftable between two switching positions by applying control system pressure to ends of said valve slide, said valve slide being held in said two positions against axial displacement by resilient detent devices; a normally open valve located in each of the control input ports and controlling the associated input port in a pressure-dependent manner and which closes when the difference of the pressures prevailing upstream and downstream of the particular valve exceeds a predetermined value; a check valve venting the portion of each control input port between the valve and the valve slide; and said check valve of the control input port to which pressure must be applied in order to switch the valve slide being connected to the outlet passage which carries pressure prior to the switching-over operation, and said check valve of the other control input port being connected to the other outlet passage.

2. The control valve as claimed in claim 1, wherein the valve slide possesses a device for operating the slide manually, and wherein an AND-gate is located upstream of each control input port, the control system pressure being applied to one input of this gate, and a pressure signal, which can be removed for the purpose of manual operation, being applied to its other input.

* * * * *